May 15, 1951 — L. E. DE NEERGAARD — 2,552,622

FREQUENCY GENERATOR FOR MACHINE CONTROL SYSTEMS

Original Filed Oct. 6, 1942 — 2 Sheets-Sheet 1

INVENTOR.
LEIF ERIC DE NEERGAARD
BY Fay, Golrick & Fay
ATTORNEYS

May 15, 1951     L. E. DE NEERGAARD     2,552,622
FREQUENCY GENERATOR FOR MACHINE CONTROL SYSTEMS

Original Filed Oct. 6, 1942     2 Sheets-Sheet 2

INVENTOR.
LEIF ERIC DE NEERGAARD
BY Fay, Golrick & Fay
ATTORNEYS

Patented May 15, 1951

2,552,622

UNITED STATES PATENT OFFICE 2,552,622

FREQUENCY GENERATOR FOR MACHINE CONTROL SYSTEMS

Leif E. de Neergaard, Buffalo, N. Y., assignor to Actrol, Inc., Tuckahoe, N. Y., a corporation of Delaware Original application October 6, 1942, Serial No. 460,955. Divided and this application April 10, 1947, Serial No. 740,688

6 Claims. (Cl. 171—209)

1

The present invention relates to apparatus for generating pulsating currents, and it is particularly adaptable for generating such currents for use in the practice of my invention disclosed and claimed in my United States Patent No. 2,423,440, of which this application is a division.

An object of the invention is to provide a pulsating current generator which can be moved along an arm for causing a stylus associated with the generator to follow the contour of a pattern over which the arm extends, the generator being slidable along the arm and being capable of causing an increase or decrease in the frequency of the pulsations in accordance with the direction and rate of movement of the generator along the arm.

Another object of the invention is to provide a generator of the type referred to in which a current is generated having a substantially fixed or a base frequency when the generator is stationary relative to the arm and which frequency varies above and below in accordance with the rate and direction of movement of the generator along the arm.

Other objects and advantages of the invention will be apparent from the following description of preferred forms of the invention, reference being made to the accompanying drawings wherein.

2

In the application mentioned hereinbefore, I have disclosed and claimed a method by which a machine tool or the like can be operated from a recording of pulsating electric currents to reproduce movements in the tool, which movements were formerly made by a stylus following a pattern or template. In recording the currents, the stylus is operatively connected with generators and is arranged to move relative to two or more ordinates of a coordinate system. The generators are each associated with a respective ordinate of the coordinate system, and they are each adapted to generate a current having a relatively fixed, or base frequency while the stylus is stationary relative to the ordinates with which the respective generators are associated, and which increase or decrease the frequencies of the current generated thereby in accordance with the rate and direction of movement of the stylus relative to the respective ordinances. The recorded frequencies, including a current having only the base frequency, are reproduced simultaneously and the tool moved along ordinates of a similar coordinate system in accordance with the variation in the recorded frequencies from the recorded base frequency. The present invention is directed to the generators for generating these pulsating currents.

Figure 1:
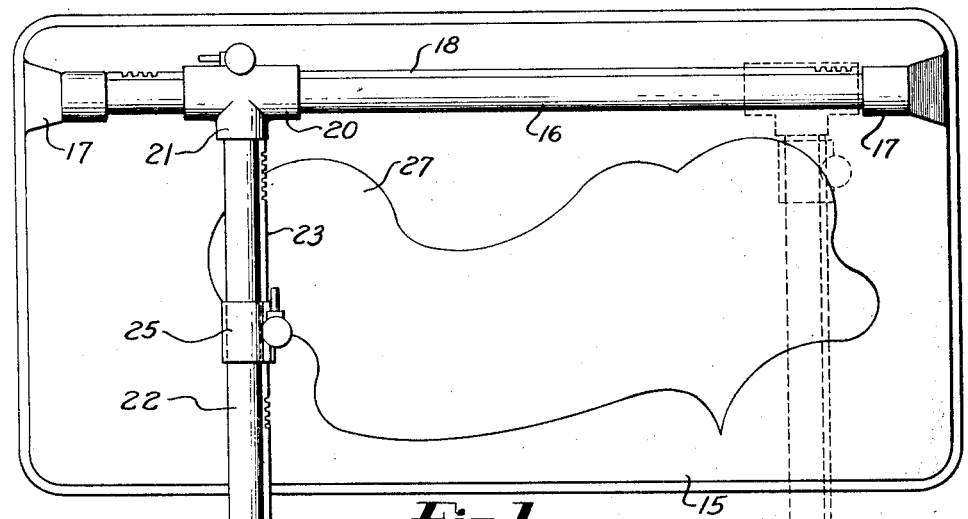
Fig. 1 is a plan view of a device referred to as a translator, by which the movements of a stylus about the outline of a pattern can be translated into a plurality of electrical pulsating currents.
Figure 2:
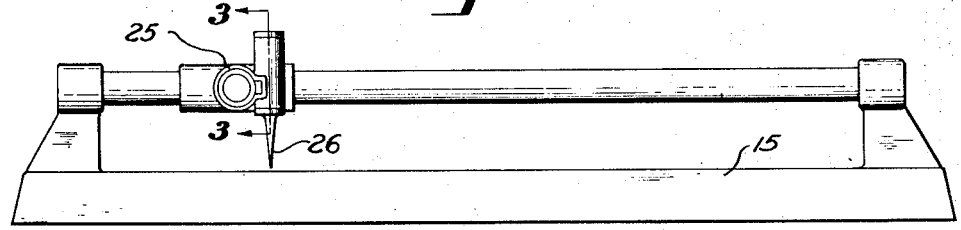
Fig. 2 is a view of the mechanism shown in Fig. 1.

Referring now to Fig. 1, there is shown a translator consisting of a base 15 having a flat surface upon which a template or pattern 27 may be placed so that a stylus can be moved about the outline of the pattern. Means, not shown, may be provided for securing the pattern to the base.

A rod-like support member 16 extends lengthwise of the base and adjacent one edge thereof, and the ends of member 16 are supported slightly above the base by two brackets 17. The member 16 has a gear rack 18 extending from one end to the other and the rack projects from the side of the member.

A bracket 20, formed of non-magnetic material, such as brass, and having a cylindrical opening therethrough for receiving the support 16, is mounted on the support and is adapted to slide on the support. The cylindrical opening in the bracket is provided with a rectangular offset for receiving the gear rack 18, and the gear rack cooperates with the walls of the offset opening to prevent the bracket from rotating on the support.

The bracket 20 is provided with an extension 21 to which an arm 22 is attached, the arm extending at 90° from the support rod 16. The support 16 and arm 22 lie in a plane parallel to the surface of the base 15. The arm 22 is similar to the rod 16, and it is provided with a gear rack 23 which extends along one side the length thereof. The gear rack 23 is similar to the gear rack 18. A bracket 25, formed of non-magnetic material, is mounted on the arm 22 by being provided with a cylindrical opening for receiving the arm. An offset opening is provided within the cylindrical opening for receiving the gear rack 23 so that the gear rack cooperates with the walls of the offset opening to prevent rotation of the bracket 25 on the arm. A stylus 26 is formed integral with the bracket 25 and it projects downwardly to a point adjacent the surface of base 15 so that it may closely follow the outline of a template on the surface.

The support 16 and arm 22 correspond to the ordinates of a coordinate system and it will be apparent that the stylus 26 can be moved to any point over a substantial area of the base 15 by sliding bracket 20 along the support 16 and by moving the bracket 25 along the arm 22. By recording simultaneously, the movements of the brackets 20 and 25 along their respective supports and reproducing the movements of the brackets by corresponding tool controlling elements, the movements of the stylus can be reproduced in the tool, as set forth in my application mentioned hereinbefore.

In order to record the movements of the brackets 20 and 25 I have provided a novel generating mechanism, one of which is carried by each of the brackets. The generating mechanisms on each bracket are similar, and for the purposes of illustration, I will refer to the generating mechanism on bracket 25. The bracket 25 is provided with a vertically extending tubular housing 30 in which a synchronous motor 31 is enclosed. The motor includes a pinion shaft 32 which is formed of insulating material, such as Bakelite or Lucite, and it is journalled in bearings 33. The stator 35 of the motor is mounted on the upper end of the pinion shaft for rotation by the shaft, and a pinion 36 is also mounted on the shaft 32. This pinion meshes with the gear rack 23 so that as the bracket 25 is moved along the arm 22, shaft 32 together with the stator will be rotated by the pinion 36. The rotor of the motor is shown at 37 and it carries a shaft 38, axially aligned with shaft 32, and upon which a soft iron tone-wheel 39 is mounted. Alternating current is supplied to the windings of the stator 35 through two brushes 40 which ride on two slip rings 41, respectively, the slip rings being connected with the stator by wires, not shown, which extend through an opening in shaft 32 to the stator. When the bracket 25 is stationary and current is supplied to the stator 35, rotor 37 will rotate at a predetermined speed, according to the frequency of a current supplied to the stator. When the bracket is moved along arm 22 in one direction the stator will be rotated, and if rotated in the same direction as the rotation of rotor 37 the R. P. M. of the rotor will be increased correspondingly. If the bracket 25 is moved in the opposite direction the R. P. M. of the rotor 37 will be decreased by the R. P. M. at which the stator is rotated.

Figures 3, 4, 5:
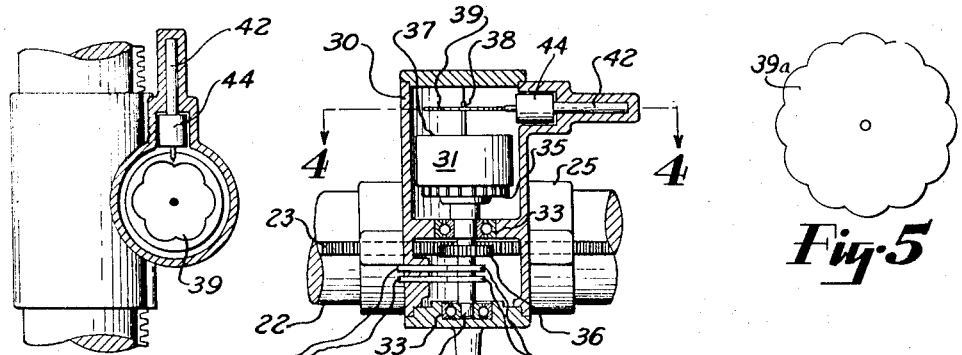
Fig. 3 is a view in section taken on line 3—3 of Fig. 2, but on a larger scale.
Fig. 4 is a view in section taken on line 4—4 of Fig. 3.
Fig. 5 is a plan view of a tone-wheel used in the frequency generator illustrated in Figs. 3 and 4.
Figure 11:
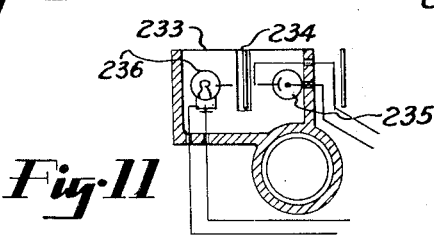
Fig. 11 is a view taken substantially on line 11—11 of Fig. 10.

The tone-wheel 39 is an element of a current generator, which generator comprises a permanent magnetic bar 42 which has an end thereof terminating adjacent to the periphery of the tone-wheel 39. Preferably, this end of the magnet is wedge shaped, and adjacent the end of the magnet is a coil 44 consisting of a multiplicity of turns of very fine wire. The tone-wheel 39 has a plurality of lobes formed thereon so that as the wheel rotates, the gap between the periphery of the tone-wheel and the end of the magnet is increased and decreased as the lobes pass adjacent to the magnet, thereby generating a pulsating current in the winding 44. In Fig. 4, I have shown a tone-wheel having six lobes, but in actual practice, more or fewer lobes may be desirable depending upon the frequency desired in the current so generated. For example, a tone-wheel 39a similar to that shown in Fig. 4, is disclosed in Fig. 5, in which there are twelve lobes. Thus, it will be seen that the current generated in the coil 44 will pulsate and while the bracket 25 is stationary relative to the arm 22, the frequency of the pulsations will be unvarying, provided the alternating current supplied to the motor 31 is unvarying, and when the bracket is moved in one direction along the arm 22 the pulsations will be increased according to the rate of movement, and when the bracket is moved in the opposite direction the pulsations will be decreased according to the rate of movement.

A similar generating mechanism is mounted in the bracket 20 and the increase and decrease in the frequency of the current generated thereby is effected by cooperation of a pinion corresponding to pinion 36 with the gear rack 18 when the bracket is moved in opposite directions along the support 16.

The current generated in the coils 44 of the generators may be connected to a suitable recording system, such as that disclosed in my co-pending application, whereby the movements of the stylus 26 relative to the coordinate system formed by the support 16 and arm 22 can be recorded.

Third dimensional recordings can be made by providing another generator mechanism similar to that described on bracket 25 and providing a stylus having a gear rack thereon for meshing with the pinion on the shaft corresponding to shaft 32. The stylus can be arranged to move vertically longitudinally so that as the stylus rises and lowers over the contour of a template it will cause variation in the frequency of the current generated in the manner described with reference to the generators on brackets 20 and 25.

Figure 6:
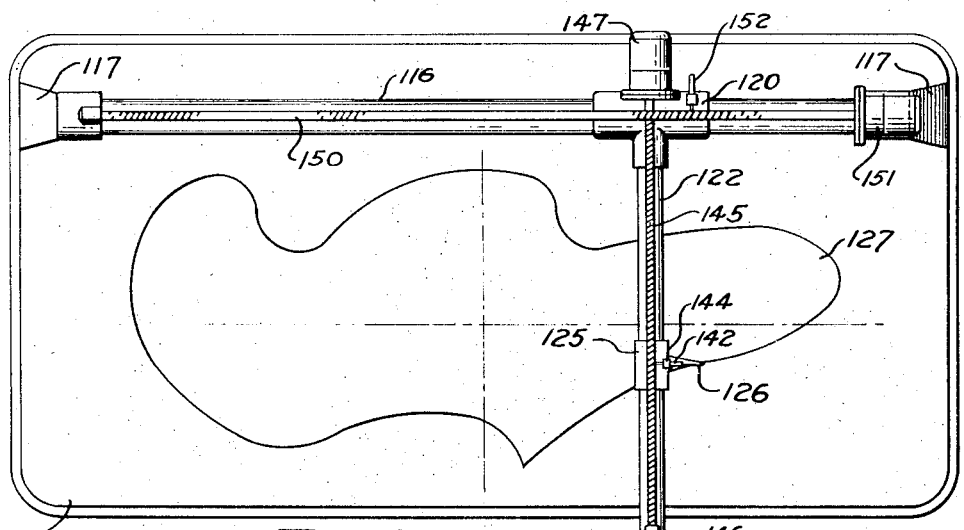
Fig. 6 is a plan view of another form of translator.
Figure 7:
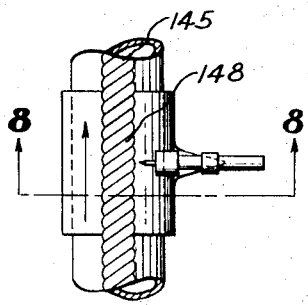
Fig. 7 is a fragmentary view of a frequency generator shown in Fig. 6, but on a larger scale.
Figures 9, 10:
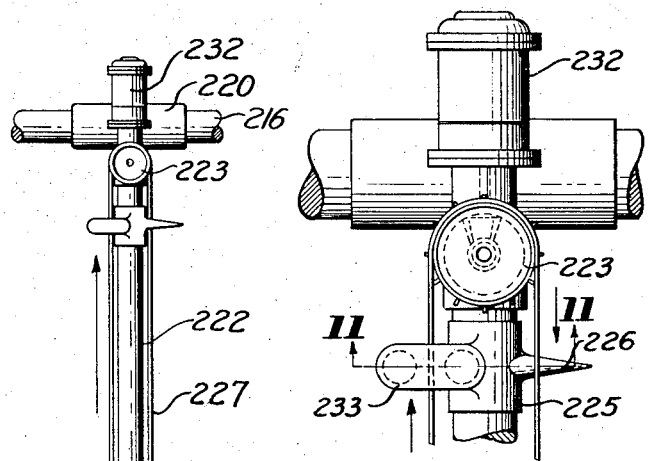
Fig. 9 is a fragmentary plan view of still another form of translator.
Fig. 10 is a view of certain parts of the mechanism shown in Fig. 9 but on a larger scale.
Figure 8:
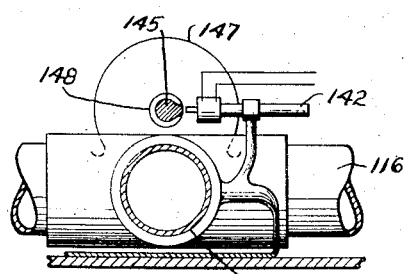
Fig. 8 is a view in section taken on line 8—8 of Fig. 7.
Figure 12:
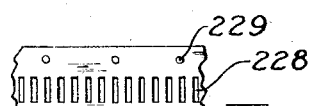
Fig. 12 is a fragmentary view of an endless tape used in the mechanism shown in Figs. 9 through 11.

Another form of the invention is shown in Fig. 6 wherein a base 115, similar to base 15, is provided with a bar 116 supported thereabove by brackets 117. A non-magnetic bracket 120 is slidingly mounted on the bar 116 similar to bracket 20 on bar 16, and the bracket 120 supports a laterally extending arm 122, which arm extends at 90° from the support 116, and the arm 122 and support 116 lie in a plane parallel to the surface of the base 115.

The arm 122 supports a non-magnetic bracket 125 which is adapted to slide therealong, and the bracket 125 is provided with a stylus 126 which extends downwardly therefrom to adjacent the surface of the base 115 so that the stylus can follow the outline of a template 127. A bar magnet 142, similar to magnet 42, is mounted on the bracket 125, and a coil 144, similar to coil 44, is mounted on the magnet adjacent the wedged end thereof. A soft iron rod 145 extends parallel to and above the arm 122, one end of the rod being journalled in a bearing 146 and the opposite end being connected with a synchronous motor 147 which is mounted on bracket 120 for rotating the rod at a constant speed. The desired rate of rotation will depend on the frequency of generated current desired and the pitch of the helix formed on the rod. The motor may drive the rod through a gear reducer. The surface of rod 145 is convoluted as at 148 and these convolutions take the form of a screw thread or helix whereby when the rod is rotated on its longitudinal axis the effect will be a passing of the convolutions in one direction by the end of the magnet 144. This causes the space between the magnet and the surface of the rod to be alternately increased and decreased thereby generating a pulsating current in the coil 144. Preferably, the convolutions are of such contour as to present a sine shape surface to the magnet. As the bracket 125 is moved along the arm in the direction opposite to the apparent movement of the convolutions it will be obvious that the frequency of the current generated in the coil will be increased, and when the bracket is moved in the opposite direction the frequency generated will be decreased. A rod 150, similar to rod 145, is mounted over rod 116 and this rod is rotated by a synchronous motor 151. A magnet assembly 152, similar to magnet 142 and coil 144, is mounted on bracket 120. Thus, pulsating current is generated by the magnet assembly 152 similar to that described with reference to the magnet assemblies 142 and 144, and the frequency of the current will vary above and below the normal or base frequency according to the rate and direction of movement of the bracket 120. The current from the coils of the two generating devices may then be recorded in a manner similar to that described with reference to the first form of the invention.

Still another form of the invention is disclosed in Figs. 9 through 12 in which I have shown a support bar 216, which may be mounted on a base in a manner similar to bar 116, on which a bracket 220 is adapted to slide. The bracket 220 supports a laterally extending arm 222 and a reel or pulley 223 is mounted at opposite ends of the arm and an endless tape 227 is mounted on the pulleys. The tape 227 is formed of an opaque material and is provided with a series of evenly spaced, uniform in width slots 228 therein, as may be seen in Fig. 12. Preferably, the tape is punctured periodically at 229 for engagement with drive teeth 230 formed on the pulleys 223. One of the pulleys 223 is driven at a constant rate by a synchronous motor 232 through suitable driving gears.

A bracket 225 is mounted on the arm 222 so that it may slide therealong and a stylus 226 projects downwardly from the bracket for engagement with a template on the surface of the base. The bracket is also provided with a housing 233 having slots 234 in opposite side walls so that the tape 227 may pass through the housing. In one side of the housing, as may be seen in Fig. 11, I have provided a photo-electric cell shown diagrammatically at 235 and on the opposite side of the tape I have provided an electric light bulb 236 which is arranged to direct a beam of light onto the photo-electric tape through the slots 228. The light beam is substantially the same width as the material between the slots 228 so that as the tape passes between the bulb and cell, the light beam will be interrupted completely for an instant between the presentation of each slot. This interrupted light beam causes a pulsating current to be reproduced in the circuit of the light sensitive cell 235. This circuit may be connected with a recording system similar to that described for recording the pulsations. It will be apparent that by moving the bracket 225 along the arm 222 the pulsations generated by the photo-electric cell 235 will be increased and decreased according to the rate and direction of movement. The frequency of the generated current will be a function of the speed of the tape and the number of slots in the tape.

It will be understood that a tape similar to tape 227 can be provided along support 216 and a photo-electric generator similar to that described can be mounted on bracket 220 so that the movements of the bracket 220 can be reflected in a pulsating current generated by the photo-electric cell.

Thus, by my invention, I have provided generators that may be readily mounted for movement along members forming ordinates of a co-ordinate system. Although the generators are formed by relatively few parts, they provide a pulsating current having a fixed or base frequency when the generator is stationary relative to its associated ordinate and which accurately increases or decreases the frequency according to the direction and rate of movement along its ordinate.

Although I have described several preferred forms of the invention, it is to be understood that other forms might be adopted, all falling within the scope of the claims which follow.

I claim:

1. A frequency generator comprising a rotatable stator; a rotor adapted to be driven by the stator at a predetermined rate relative to the stator when the latter is energized; a slidable housing for the stator and rotor, a slideway structure supporting the housing, means associated with said rotor for generating a pulsating current having a frequency depending on the speed of said rotor; and means associated with the housing and slideway for controlling the rotation of said stator about an axis common to the axis of the rotor for changing the revolutions per minute of said rotor in response to movement of the housing on the slideway.

2. A frequency generator comprising, a source of flux; means responsive to said flux for producing an electric current; a linear extending member subject to the flux and shaped for causing interruptions in said flux when relative rotary or linear movement is effected between the member and source of flux; and means for effecting said movement including mechanism for rotating the member and mechanism for moving said source of flux linearly relative to said member.

3. A frequency generator comprising in combination, a source of magnetic flux; a magnetic pickup responsive to said flux; an elongated member having a screw form; means for rotating said member on its longitudinal axis, said member being disposed in the magnetic flux so that the raised surfaces thereof are alternately moved toward and away from said source for interrupting the magnetic flux; and means for moving said source and pickup along said member for varying the rate of interruptions of the flux.

4. A frequency generator for the purposes disclosed comprising a source of magnetic flux, a magnetic pickup responsive to said flux, a rotatable member having successively arranged raised and lowered surfaces, means for rotating said member, said member being disposed in the magnetic flux so that the raised surfaces are alternately moved toward and away from said source for interrupting the magnetic flux, a non-magnetic slide for supporting the source of magnetic flux and the magnetic pickup, a slide bar passing through the slide for slidably supporting the slide and magnetic pickup, and means responsive to movement of the slide on the bar for determining the rate of interruption of the flux.

5. A frequency generator for the purposes disclosed comprising in combination a source of magnetic flux, a magnetic pickup responsive to said flux, a non-magnetic slide for said magnetic pickup, a slideway structure supporting the slide, a system of raised flux interrupting surfaces rotatably disposed within the environment of the magnetic flux and responsive in effectiveness to movement of the slide along the slideway and means for rotating said surfaces at a speed which is uniform relative to the flux source when the slide is stationary relative to the slideway.

6. A frequency generator comprising an arm, a source of flux and a flux responsive element in fixed relation to each other and moveable along said arm, said element being responsive to variations in the flux by variations in an electrical characteristic of the element, a member extending linearly parallel to said arm and subject to said flux, and means for moving said member with respect to said arm, said member being shaped to have periodically disposed along its length regions of diverse transmissibility for said flux, the shape and motion of said member being adapted to vary periodically the flux reaching said element at any given position of the element along the arm.

LEIF E. DE NEERGAARD.

REFERENCES CITED

The following references are of record in the file of this patent:

UNITED STATES PATENTS

| Number | Name | Date |
| --- | --- | --- |
| 831,475 | Rushmore | Sept. 18, 1906 |
| 1,137,544 | Severy et al. | Apr. 27, 1915 |
| 1,544,010 | Jordan | June 30, 1925 |
| 1,880,105 | Reifel | Sept. 27, 1932 |
| 2,087,782 | Rossman | July 20, 1937 |
| 2,261,644 | Cockrell | Nov. 4, 1941 |
| 2,376,421 | Drake | May 22, 1945 |